United States Patent
Tamaru et al.

(10) Patent No.: US 7,104,654 B2
(45) Date of Patent: Sep. 12, 2006

(54) LIGHT SOURCE UNIT AND PROJECTOR HAVING THE SAME

(75) Inventors: Shuji Tamaru, Kobe (JP); Kenji Maruyama, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/778,493

(22) Filed: Feb. 13, 2004

(65) Prior Publication Data

US 2004/0223125 A1  Nov. 11, 2004

(30) Foreign Application Priority Data

Feb. 17, 2003 (JP) .............................. 2003-038906

(51) Int. Cl.
*G03B 21/20* (2006.01)
*F21S 8/00* (2006.01)

(52) U.S. Cl. ...................... 353/85; 353/119; 353/87; 362/368; 362/430

(58) Field of Classification Search ............ 353/85–87, 353/97, 100–102, 119, 122, 98, 99; 362/430, 362/226, 368
See application file for complete search history.

(56) References Cited

U.S. PATENT DOCUMENTS

| 3,891,421 | A | * | 6/1975 | Levin ........................... 65/107 |
| 4,457,600 | A | * | 7/1984 | Hall ............................ 353/122 |
| 6,086,231 | A | * | 7/2000 | Kenjo et al. ................. 362/507 |
| 6,461,025 | B1 | * | 10/2002 | Payne ......................... 362/374 |
| 6,695,461 | B1 | * | 2/2004 | Ozawa et al. ............... 362/268 |
| 6,840,633 | B1 | * | 1/2005 | Davis et al. .................. 353/98 |
| 2002/0176255 | A1 | * | 11/2002 | Yamauchi et al. .......... 362/299 |

FOREIGN PATENT DOCUMENTS

JP   2001-101923   4/2001
WO   WO 99/32825   7/1999

OTHER PUBLICATIONS

Hyperdictionary.com, Meaning of Projector,WordNet Dictionary.*

* cited by examiner

*Primary Examiner*—W. B. Perkey
*Assistant Examiner*—Andrew Sever

(57) ABSTRACT

An object of this invention is to provide a light source unit capable of effectively utilizing converged light from a high-pressure discharge lamp by positioning light axes of an ellipsoidal mirror and a lens to coincide.

8 Claims, 12 Drawing Sheets

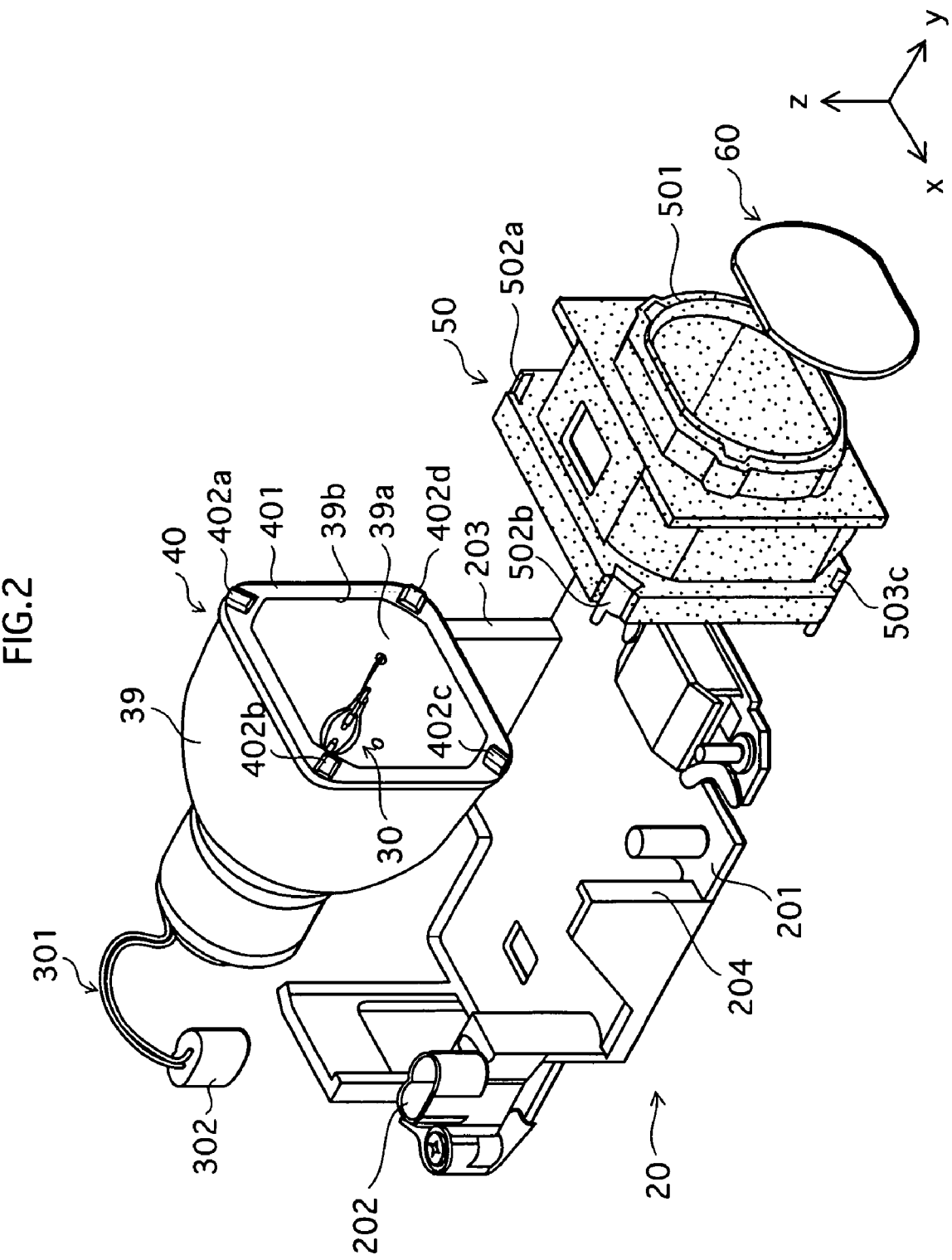

(LIGHT AXIS IS SET AT A RIGHT POSITION
EVEN WHEN FLANGE SHAPE VARIES)

FIG.10A  STANDARD
PROJECTION (SLIDABLE ALONG BROKEN LINE)
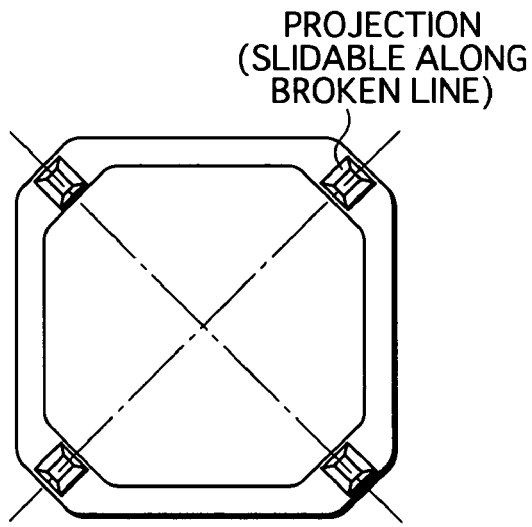
FIG.10C  SMALLER THAN STANDARD
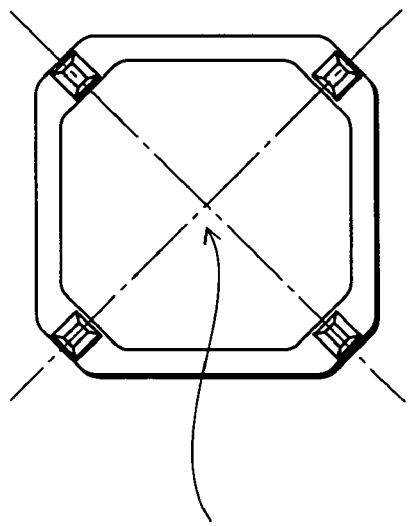
LIGHT AXIS IS SET AT A RIGHT POSITION
FIG.10B  STANDARD
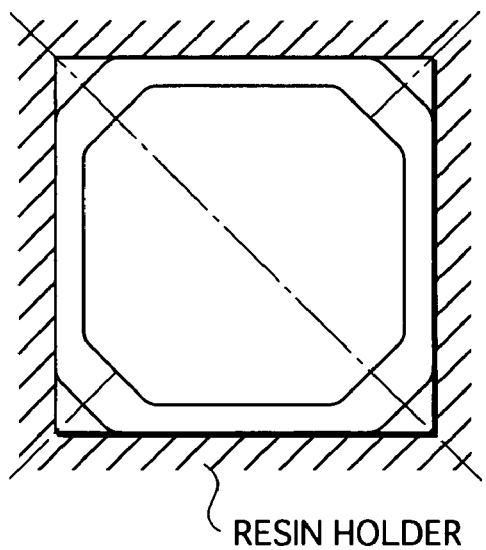
RESIN HOLDER
FIG.10D  SMALLER THAN STANDARD
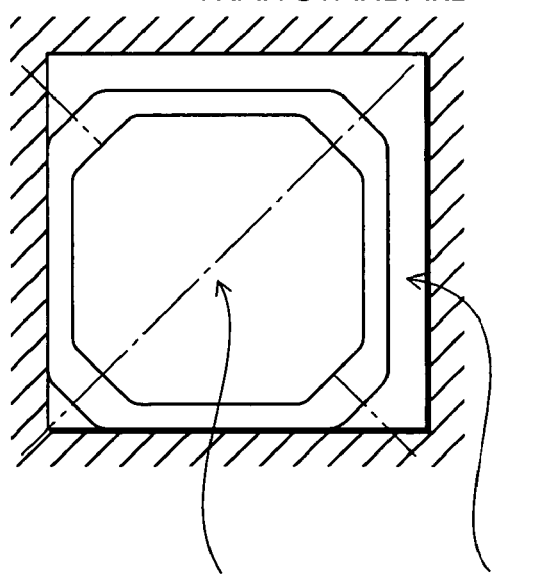
LIGHT AXIS IS NOT SET AT A RIGHT POSITION    GAP

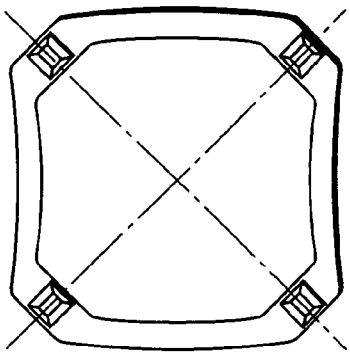
FIG.11A RECTANGULAR
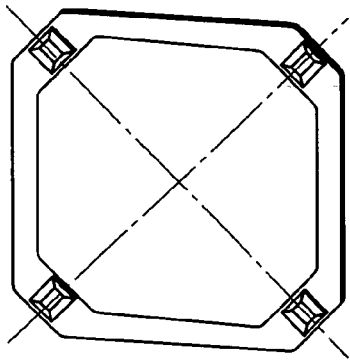
FIG.11C RHOMBIC
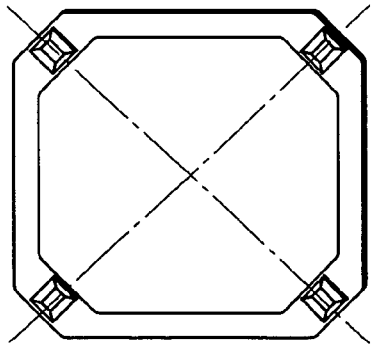
FIG.11E CURVED
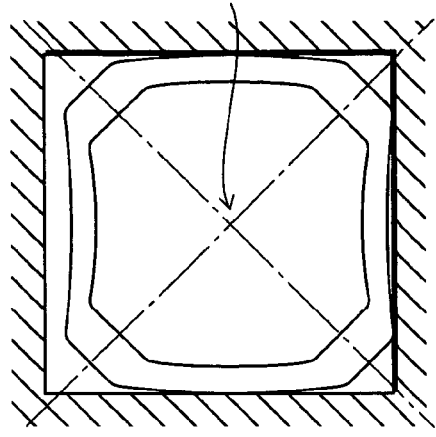
FIG.11B RECTANGULAR
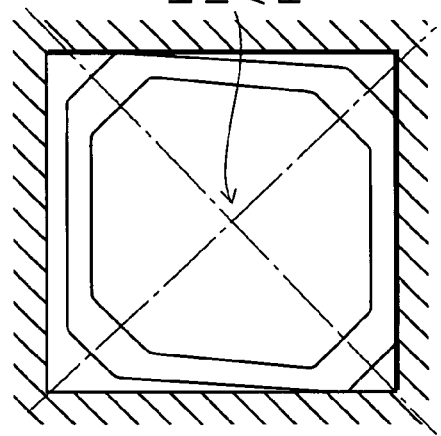
FIG.11D RHOMBIC
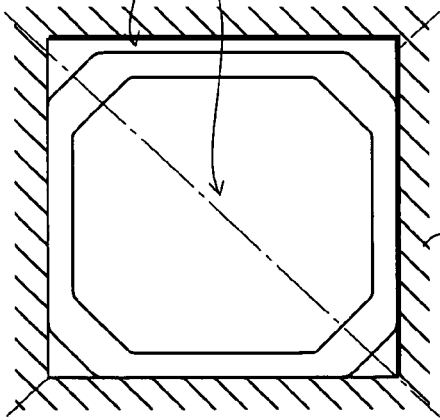
FIG.11F CURVED

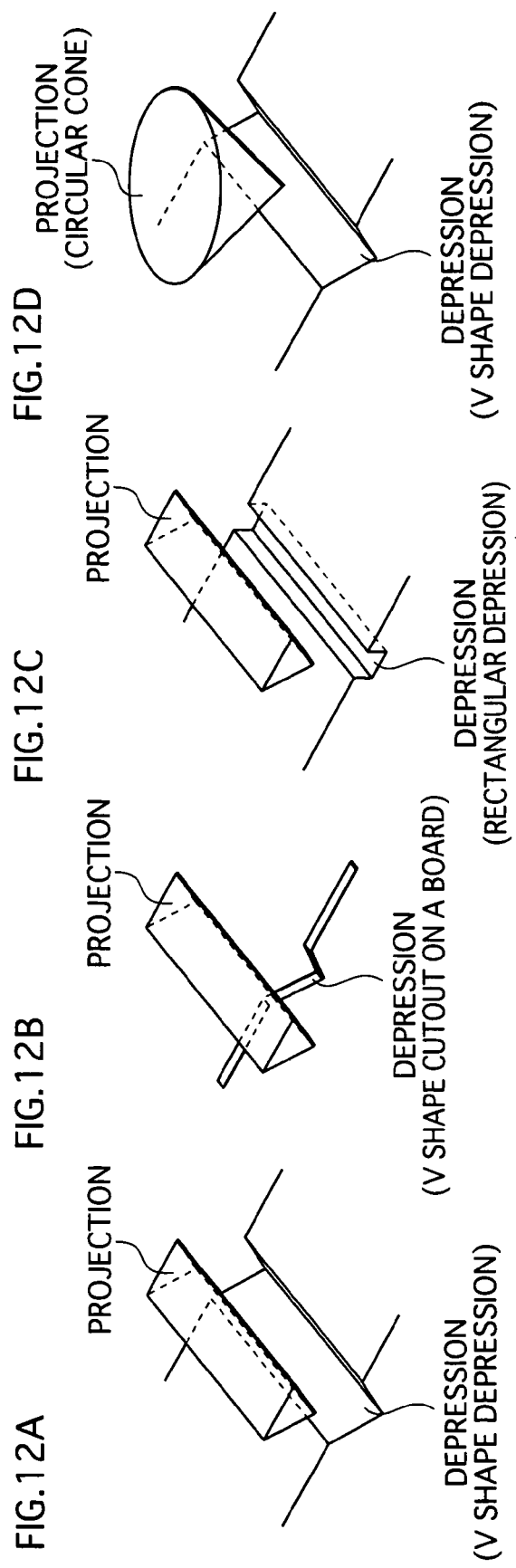

LIGHT SOURCE UNIT AND PROJECTOR HAVING THE SAME

BACKGROUND OF THE INVENTION (1) Field of the Invention

The present invention relates to a light source unit and a projector having the light source unit, and more specifically, to a technique for an adjustment of light axes between a high pressure discharge lamp and a concave lens set in the light source unit.

(2) Description of the Related Art

High pressure discharge lamps as typified by high pressure mercury lamps have excellent properties such as high luminance, light emission effectiveness, and longevity. Thus, the high pressure discharge lamps are desirable as a Video Projector System (VPS) lamp for a light source unit of a projector. An example of the high pressure discharge lamps is disclosed in Japanese Laid-Open Patent Application No. 2001-101923.

In the projector, it is common that parallel light from the high pressure discharge lamp is used to display an image. In recent years, however, light source units, in which the light from the high pressure discharge lamp is converged and then used to display an image, have been introduced. According to this kind of light source units, a concave lens held by a holder is set in front of an ellipsoidal mirror (paraboloidal mirror) that surrounds the high pressure discharge lamp, and light axes of the ellipsoidal mirror and the concave lens are adjusted to be set at substantially the same position.

By adopting the light source unit having the above structure, it is possible to obtain various advantages. Specifically, in addition to a dramatic improvement in light utilization using the light from the high pressure discharge lamp collimated by the ellipsoidal mirror and converged by the concave lens, it is also possible to downsize optical elements on an optical path with the converging of the light.

At the same time, adopting the above light source unit, in which the light from the high pressure discharge lamp is converged by the concave lens, also has a disadvantage that the adjustment of the light axes in the light source unit becomes more strict than before.

In a case of the light source unit in which the parallel light is used, the light utilization is not affected much, even if positions of the light axes of the lamp and the optical device do not coincide. However, in a case in which the light from the high pressure discharge lamp is converged by the concave lens, if the light axes of the ellipsoidal mirror and the concave lens do not substantially coincide, a convergence point of the ellipsoidal mirror deviates from the concave lens. As a result, it becomes extremely hard to catch the light within the concave lens, and therefore, the light utilization decreases drastically.

Even though a rough positioning is done in a case of the light source unit in which the ellipsoidal mirror and the concave lens are used, the positioning is based on relative positions of a rim of a flange of the ellipsoidal mirror and a holder that holds the concave lens. With such a positioning method, the concave lens easily moves its position inside the rim of the flange, and accordingly, it becomes difficult to adjust the light axes to be set at a desirable position that is sufficient for the light source unit in which the light from the high pressure discharge lamp is converged by the concave lens.

The above noted problem in the positioning of the ellipsoidal mirror and the concave lens leads to decreased performance of the projector that uses the high pressure discharge lamp, and is desired to be solved as soon as possible. The same kind of problem occurs in a case in which an optical element such as a lens other than the concave lens is utilized.

Thus, a room for improvement is still left in order for a more strict adjustment of the light axes between the ellipsoidal mirror and the concave lens in the light source unit utilizing the high pressure discharge lamp.

SUMMARY OF THE INVENTION

An object of the present invention is to provide a light source unit capable of utilizing light from a high pressure discharge lamp that is well converged by setting light axes of an ellipsoidal mirror and a lens at a correct position in comparison with a conventional example, and a projector with excellent performance in displaying images using the light source unit.

An example of the present invention that realizes the above object is a light source unit comprising: an ellipsoidal mirror having an ellipsoid mirror surface and a flange disposed so as to surround the mirror surface, a plurality of pairs of first fitting parts being disposed on a surface of the flange, the first fitting parts in each pair facing one another across a light axis of a lamp; the lamp disposed in a space surrounded by the ellipsoidal mirror such that rays emitted from the lamp are reflected on the mirror surface so as to be irradiated as parallel rays; a holder having second fitting parts disposed so as to face the first fitting parts, the second fitting parts fitting one-to-one with the first fitting parts, the holder and the ellipsoidal mirror thereby being integrated; and a lens held by the holder so as to face the lamp, wherein when the first fitting parts and the second fitting parts are fitted together, a light axis of the ellipsoidal mirror and a light axis of the lens substantially coincide.

Further, another example of the present invention is a light source unit comprising: an ellipsoidal mirror having an ellipsoid mirror surface and at least three first fitting parts disposed on a rim thereof; the lamp disposed in a space surrounded by the ellipsoidal mirror such that rays emitted from the lamp are reflected on the mirror surface so as to be irradiated as parallel rays; a holder having second fitting parts disposed so as to face the first fitting parts, the second fitting parts fitting one-to-one with the first fitting parts, the holder and the ellipsoidal mirror thereby being integrated; and a lens held by the holder so as to face the lamp, wherein each first fitting part is slidable against a corresponding second fitting part in a direction that intersects perpendicular to a light axis of the ellipsoidal mirror, and when the first fitting parts and the second fitting parts are fitted together, the light axis of the ellipsoidal mirror and a light axis of the lens substantially coincide.

According to a light source unit having the above structure, the ellipsoidal mirror and the holder are set correctly at predetermined positions facing each other, with the first fitting parts and the second fitting parts provided to the ellipsoidal mirror and the holder, respectively. Accordingly, an effect is obtained that the light axes of the ellipsoidal mirror and the converging lens held by the holder are set at substantially the same position.

Further, in the example of the present invention, each first fitting part is slidable against a corresponding second fitting part in a direction that intersects perpendicular to a light axis of the ellipsoidal mirror. Accordingly, it is possible to reduce shakiness and prevent the misalignment of the light axes, even if contraction percentage of the glass material for the ellipsoidal mirror varies and a size and a interval between two fitting parts become different.

Specifically, it is desirable that (i) the first fitting parts are prism-shaped projections and the second fitting parts are depressions corresponding to the shape of the projections, or (ii) the second fitting parts are the projections and the first fitting parts are the depressions. In this case, each of the prism-shaped projections is positioned in a manner that a center line in a lengthwise direction thereof is in a direction intersecting with the light axis of the lamp.

With such a structure, the positioning is done in a manner that the inclined planes of either a first fitting part or a second fitting part having a trapezoidal cross-section touch a corresponding fitting part and both center lines of the projection and the depression coincide. Accordingly, it becomes even more effective in positioning of the light axes of the ellipsoidal mirror and the converging lens, because the center of the projection is always set at the same position, and misalignment of the light axes is prevented.

It is desirable that each of the prism-shaped projections has a plane inclining at an angle of 30 degrees to 60 degrees with respect to a surface of the flange, in order to prevent the misalignment of the light axes of the ellipsoidal mirror and the converging lens even more effectively.

Further, with the first fitting parts in each pair facing one another across the light axis of the lamp, weight distribution among each fitting parts becomes better when assembled, and a stable and even more accurate positioning becomes possible.

By utilizing the above described light source unit, it is possible to realize a projector with an excellent performance utilizing high light effectiveness and suppressing the misalignment of the light axes. Accordingly, it is possible to give excellent display performance with less unevenness in luminance.

The above described ellipsoidal mirror may be manufactured in a method including a pressing step in which glass material is placed in a depression in a body mold and pressed by an arrow mold and a ring mold, the arrow mold having a corresponding shape to the depression in the body mold, and the ring mold for forming a rim of the ellipsoidal mirror, wherein the first fitting parts are formed by one of the arrow mold and the ring mold. By using the above manufacturing method, a center of the arrow mold that determines a position of the light axis of the ellipsoidal mirror and a center of the ring mold always coincide, and accordingly, the projections on the rim of the ellipsoidal mirror are formed at right positions with respect to the light axis of the ellipsoidal mirror. As a result, it is possible to adequately set positions of the ellipsoidal mirror and the holder, and consequently positioning of the ellipsoidal mirror and the converging lens is done correctly.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 is an exploded view illustrating a structure of a light source unit;

FIGS. 10A through 10D illustrate a top view of the ellipsoidal mirror;

FIGS. 11A through 11F illustrate the top view of the ellipsoidal mirror; and

FIGS. 12A through 12D illustrate variations in combination of the projection and a depression.

DESCRIPTION OF THE PREFERRED EMBODIMENT

The following describes preferred embodiment of the present invention with reference to the drawings.

First Embodiment 1-1 Structure of Light Source Unit

Figure 1A:
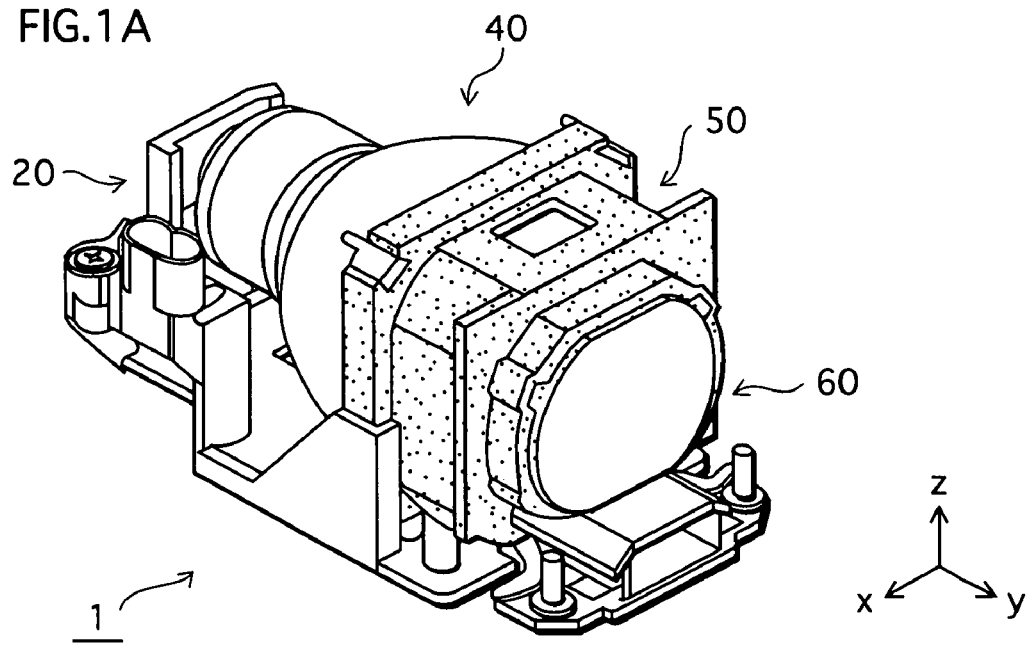
FIGS. 1A and 1B are perspective views illustrating a structure of a light source unit.
Figure 1B:
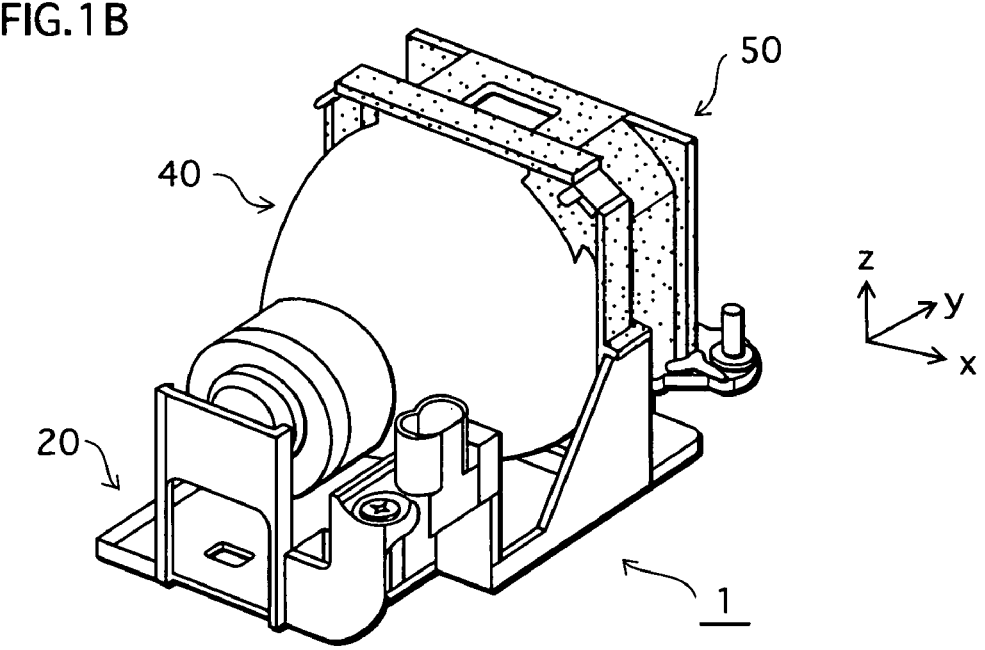

FIGS. 1A and 1B are perspective views illustrating a structure of a light source unit 1 according to a first embodiment of the present invention. FIG. 1A is an oblique forward view, and FIG. 1B is a oblique backward view of the light source unit 1, respectively.

The light source unit 1 as shown in FIGS. 1A and 1B is such that an optical lighting apparatus 40 having a high pressure mercury lamp 30 disposed in a space surrounded by the ellipsoidal mirror such that rays emitted from the lamp are reflected on a mirror surface so as to be irradiated as parallel rays is set at a right position in relation to and in front of a concave lens 60 by way of a resin holder 50, and set in a resin base 20.

FIG. 2 is an exploded view illustrating a specific structure of the light source unit 1 illustrated in FIGS. 1A and 1B.

The optical lighting apparatus 40 is such that the high pressure mercury lamp 30 as a VPS lamp is attached to an ellipsoidal mirror 39 having an ellipsoidal and mirror finished reflecting surface 39a. Wirings from the high pressure mercury lamp 30 are bundled together as a power supply wire 301 into a socket 302, and the socket 302 is fit into a socket 202 provided to the resin base 20. Power is supplied to the high pressure mercury lamp 30 from an external power source, through wirings (not shown in the drawing) from the socket 202 and the power supply wire 301.

The lamp in the optical lighting apparatus 40 is not restricted to the high pressure mercury lamp 30, and other kind of lamps including high pressure discharge lamps such as metal halide lamps, and halogen lights may also be used.

As a major characteristic in the first embodiment, a rim of the ellipsoidal mirror 39 around an opening 39b is substantially square, and prism-shaped projections 402a–402d are disposed on a flange 401 surrounding the mirror surface of the ellipsoidal mirror 39, in a manner that a center line of each of the projections in a lengthwise direction is in a direction intersecting with the light axis of the ellipsoidal mirror 39 so as to form a symmetrical cross shape. The projections 402a–402d work as fitting parts of the ellipsoidal mirror 39, and accordingly, it becomes possible to fit the ellipsoidal mirror 39 in the resin holder 50 complementary. By fitting the projections 402a–402d and the resin holder 50 each other, the light axes of the ellipsoidal mirror 39 and the concave lens 60 are adjusted to coincide. An effect of the above stated characteristic is detailed later.

The resin holder 50, which is made of material having high heat resistance and mechanical strength such as polyphenylene sulfide (PPS), is provided in order to hold the concave lens 60 in an opening 501 of the resin holder 50, at a predetermined distance from the opening 39b of the ellipsoidal mirror 39. The resin holder 50 also serves as a cover for the high pressure mercury lamp 30.

Securing parts 502a–502d are disposed on a surface of the resin holder 50 facing the projections 402a–402d on the flange 401 of the ellipsoidal mirror 39. In order to fit in the projections 402a–402d as first fitting parts, depressions 503a–503d as second fitting parts are provided in the securing parts 502a–502d.

Although, the four projections 402a–402d as the first fitting parts are disposed in a cross-shape configuration on the flange 401 in the first embodiment, a number of the projections (first fitting parts) of the present invention is not restricted to four, and maybe three or more. With at least three projections (first fitting parts), it is possible to effectively suppress the first and second fitting parts deviating from each other. Further, even more accurate positioning is possible by having such a structure that each of the projections (first fitting parts) is slidable against a corresponding depression (second fitting part) in a direction that intersects perpendicular to a light axis of the ellipsoidal mirror.

In a case in which even number of projections are provided, it is desirable that each pair of the projections are disposed so as to face each other across the light axis and to make center lines in lengthwise directions of the two projections in the same direction. By providing the projections in this way, a position in one direction is set by one pair of the projections, and a position in another direction is set by another pair of the projections. Accordingly, it is possible to accurately set the position two-dimensionally in parallel with a surface of the flange 401.

The resin base 20, like the resin holder 50, is made of heat resistant resin. The resin base 20 holds the ellipsoidal mirror 39 and the resin holder 50 that are fitted together in a manner that the ellipsoidal mirror 39 and the resin holder 50 are positioned on a plate 201 of the resin base 20 and held between securing parts 203 and 204 that are provided at both side edges of the plate 201.

1-2 Structure of Optical Lighting Apparatus

Figure 3A:
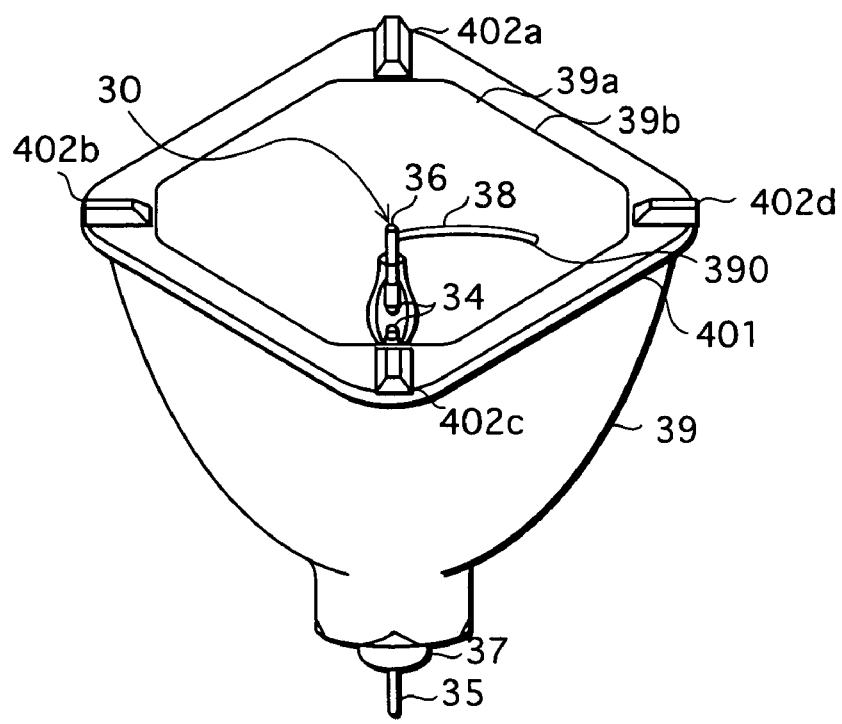
FIGS. 3A, 3B, and 3C illustrate a structure of an optical lighting apparatus.
Figure 3B:
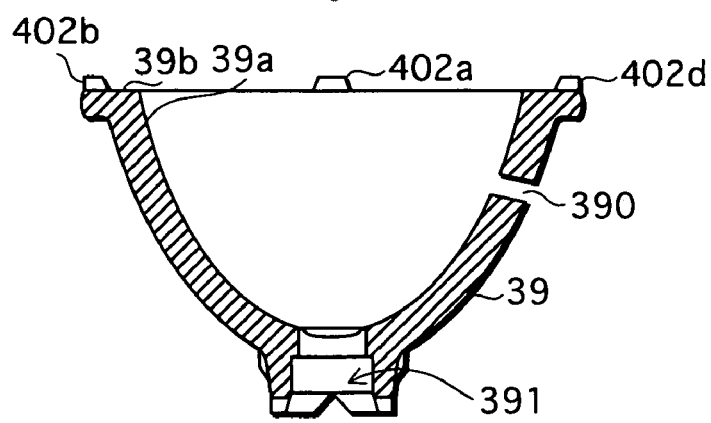
Figure 3C:
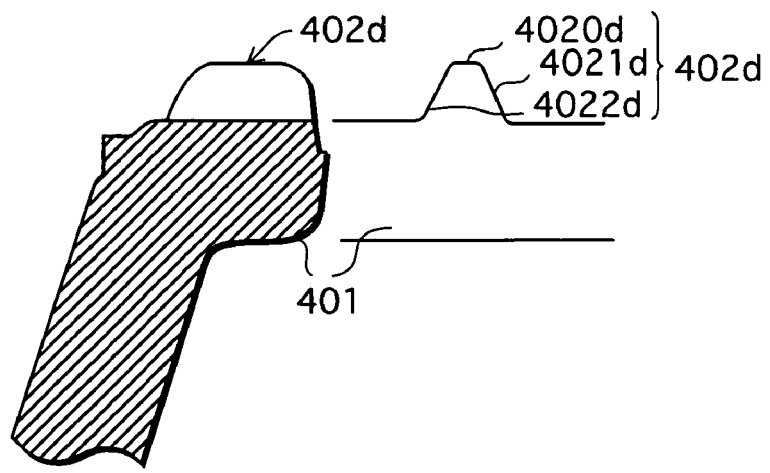

FIGS. 3A, 3B, and 3C are illustrating a structure around the high pressure mercury lamp 30 of the optical lighting apparatus 40. FIG. 3A is a perspective view, FIG. 3B is a cross-sectional view of the ellipsoidal mirror, and FIG. 3C is an enlarged view of the projection 402d.

Figure 5:
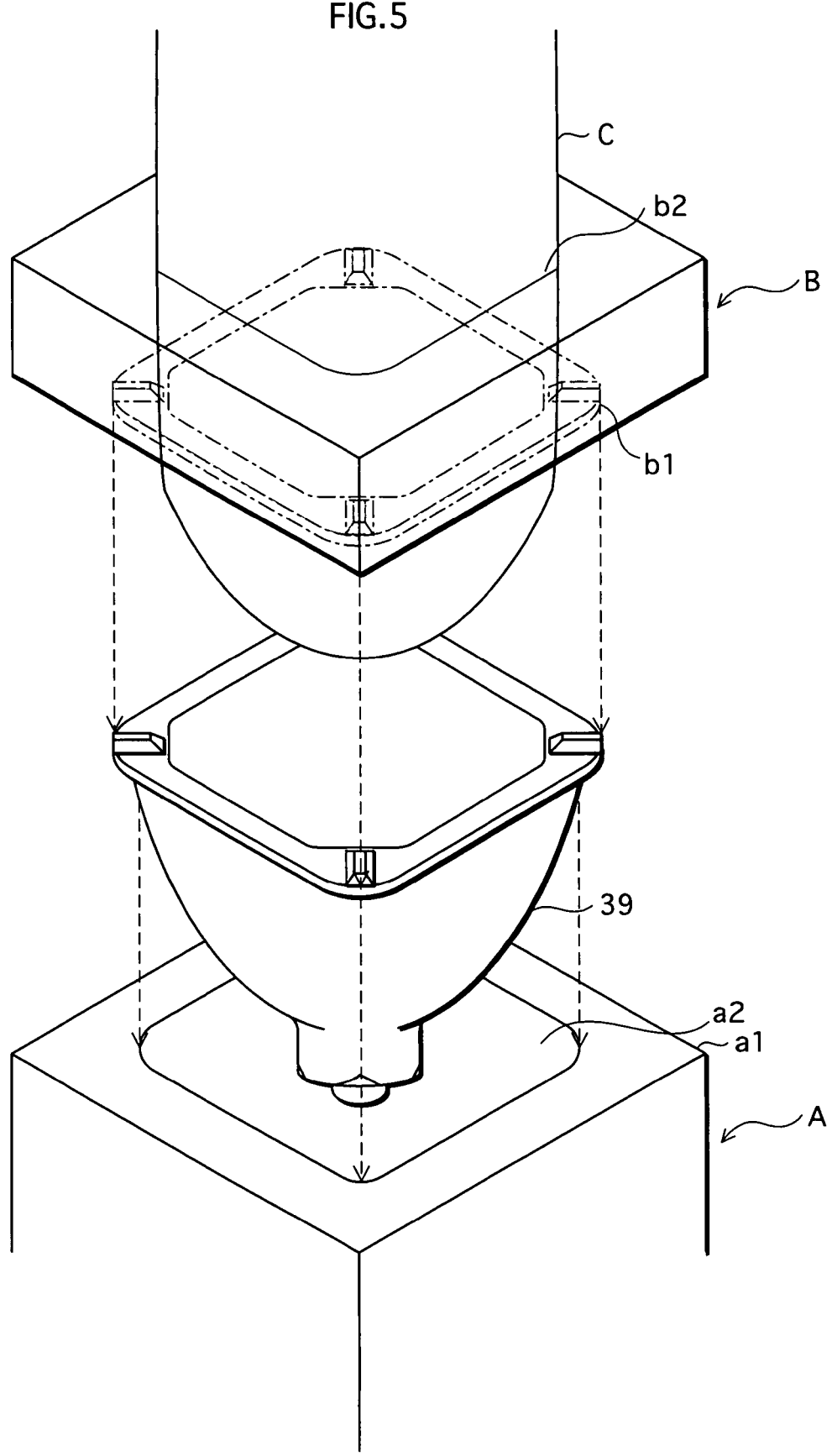
FIG. 5 illustrates a production process of an ellipsoidal mirror.

The ellipsoidal mirror 39 is made of heat resistant glass material. An example of a method for manufacturing the ellipsoidal mirror 39 is such that, as shown in FIG. 5, softened glass material at a high temperature is put into a body mold A having a depression a2, and a ring mold B with a flange mold b1 having a corresponding shape to the flange 401 is pressed toward an edge a1 of the body mold A, and an arrow mold C is pressed into the body mold A through an opening b2 of the ring mold B, thereby forming the ellipsoidal mirror 39.

In order to obtain high reflectivity, such as an aluminum evaporation process, for example, may be used for mirror finish of the reflecting surface 39a. The ellipsoidal mirror 39 has a cap insertion hole 391 at a center of the ellipsoidal mirror 39, and an external leading wire 35 of the high pressure mercury lamp 30 is put through the cap insertion hole 391 via a cap 37.

The reflecting surface 39a has a penetrating hole 390, and a power supply wire 38 connected to an external leading wire 36 is put through the penetrating hole 390.

One of characteristics of the optical lighting apparatus 40 is that the rim of the ellipsoidal mirror 39 around the opening 39b is substantially square, and accordingly, the flange 401 is formed to be substantially square. The shape of the opening 39b and the flange 401 is substantially square so as to secure the ellipsoidal mirror 39 to the resin holder 50, and to keep the ellipsoidal mirror 39 from rotating.

A cross-section of the projection 402d is substantially trapezoidal, as shown in FIG. 3C, with a top plane 4020d and inclined planes 4021d and 4022d. The projection 402d is disposed at one of four corners of the substantially square flange 401 so as to fit in the depression 503d on the resin holder 50. The projections 402a–402d have the same shape, disposed each at a different one of the four corners so as to fit a corresponding depression, and form a cross shape with the light axis of the high pressure mercury lamp 30 at a center.

The high pressure mercury lamp 30 include a substantially spheroid arc tube made of silica glass. In the arc tube, a pair of electrodes 34 whose tips face each other is provided, and mercury as light-emitting metal, bromine as halogen, and argon gas for starting up are enclosed at a predetermined pressure.

1-3 Effects of First Embodiment

Figure 7A:
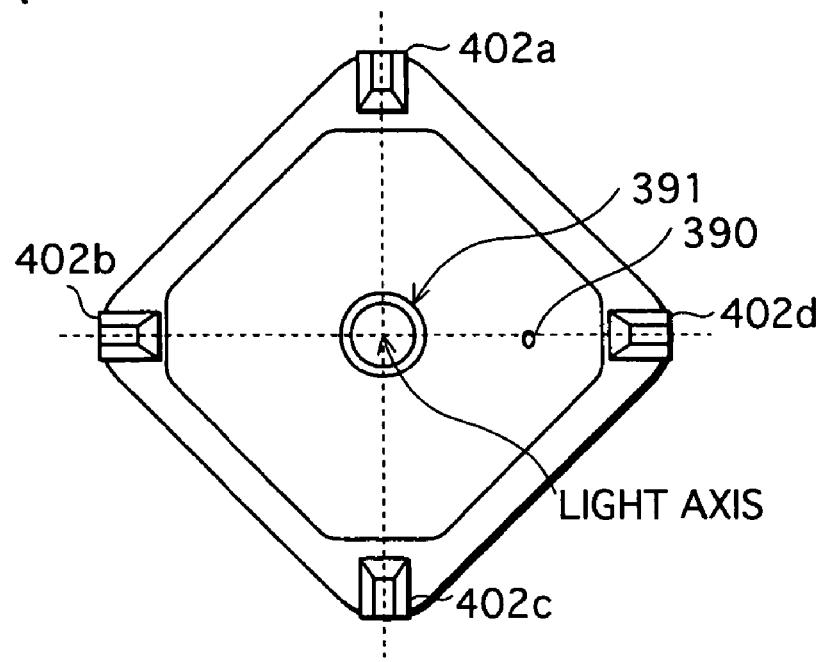
FIGS. 7A and B are views illustrating a structure in vicinity of a flange of the ellipsoidal mirror.
Figure 7B:
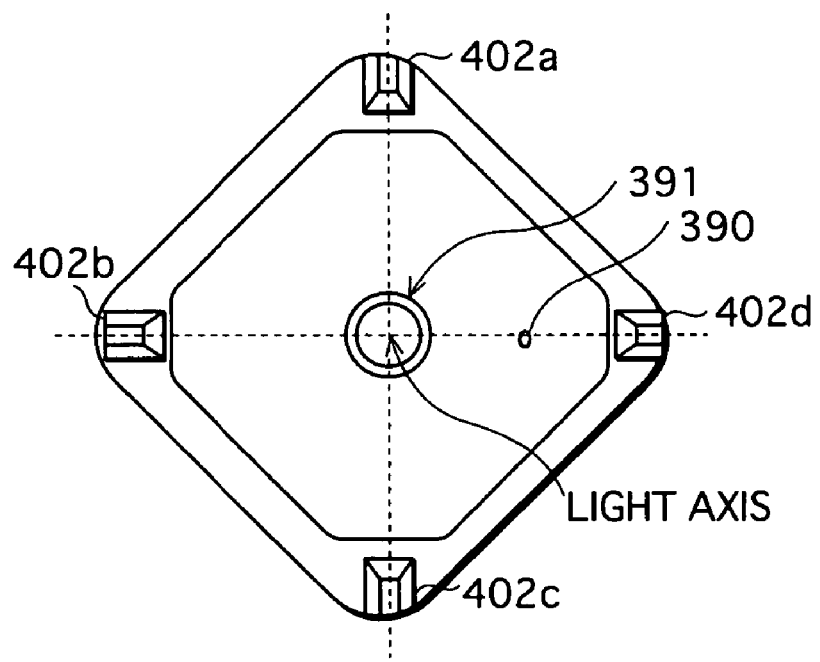
Figure 8:
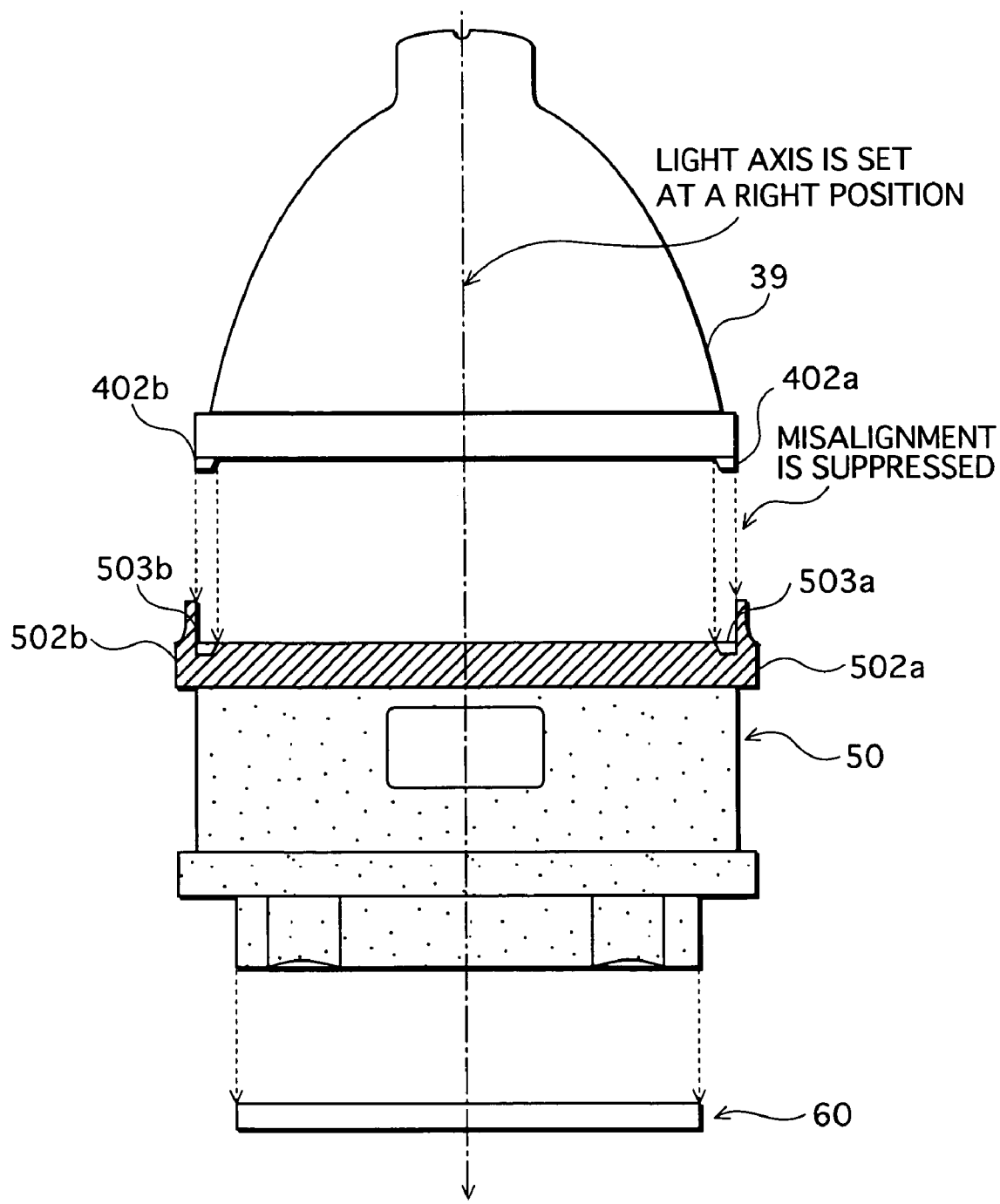
FIG. 8 illustrates a positional relation of the ellipsoidal mirror, a resin holder, and a concave lens.
Figure 9A:
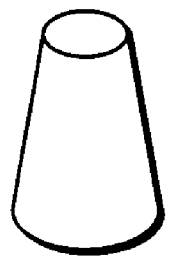
FIGS. 9A through 9E illustrate variations in shape of a projection.
Figure 9B:
Figure 9C:
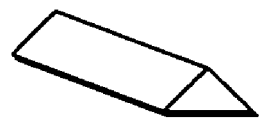
Figure 9D:
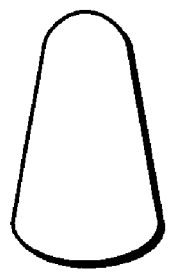
Figure 9E:
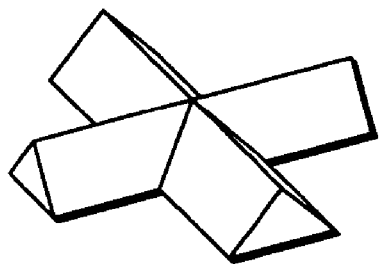

According to the light source unit 1 of the first embodiment having the above structure, the ellipsoidal mirror 39 and the resin holder 50 are attached to each other at four points, by fitting the projections 402a–402d on the flange 401 in the depressions 503a–503d of the resin holder 50, respectively. By the above structure, as shown in FIG. 8, it is possible to position the ellipsoidal mirror 39 and the concave lens 60 at predetermined positions relatively easily and accurately. Especially, in the first embodiment, the projections 402a–402d are in a prism shape, and inclined planes 4021a–4021d and 4022a–4022d that are at greater or equal to 45 degrees to the surface of the flange 401 (it is possible to adjust the angle in a range of 30–60 degrees according to the present invention) are in contact with the depressions 503a–503d, and the positioning is done complementary so that the center lines of the projections 402a–402d and the depressions 503a–503d meet, respectively. Specifically, a pair of the projections 402a and 402c are used for positioning accurately in a widthwise direction in FIG. 7, and the projections 402b and 402d are used for positioning accurately in a lengthwise direction in FIG. 7.

By the above complementary and two-dimensional positioning using the edge lines of the projections 402a–402d and the through lines of the depressions 503a–503d, it is possible to set the center as a basing point for positioning of the flange 401 and the resin holder 50, and thus a dramatically accurate positioning is possible in comparison with the conventional light source unit.

In the conventional light source unit, the positioning is done in a manner that an ellipsoidal mirror is put in a box shaped resin holder and pressing the ellipsoidal mirror against one side of the resin holder (see FIG. 10B). Accordingly, the resin holder needs to have a largest inside dimension within dimensional tolerance, and a gap between the resin holder and the ellipsoidal mirror easily becomes large due to a difference in sizes, and the light axes of the resin holder and the ellipsoidal mirror 39 are not easily set at the same position when securing the ellipsoidal mirror and the resin holder by pressing the ellipsoidal mirror against one side of the resin holder (see FIG. 10B, a cross section of broken lines indicates the light axis of the ellipsoidal mirror). Further, the light axes of the ellipsoidal mirror and the resin holder are not easily set at the same position when the shape of the rim of the ellipsoidal mirror is distorted and not square (examples of various types of distortion: rectangular as shown in FIG. 11B, rhombic as shown in FIG. 11D, and curved as shown in FIG. 11F). In order to solve the above problem, the light source unit 1 of the present embodiment effectively set the light axes to coincide by positioning the ellipsoidal mirror 39 and the concave lens 60 at the predetermined positions in the above described manner.

Furthermore, in the light source unit 1 of the present embodiment, the flange 401 of the ellipsoidal mirror 39 is formed to be substantially square, and the projections 402*a*–402*d* at the four corners are positioned to form a symmetrical cross with the light axis at a center. Therefore, sliding of the position of the ellipsoidal mirror 39 to any of the four radial directions of the cross viewed from a front side of the ellipsoidal mirror 39 is suppressed. In addition, by positioning each of the projections 402*a*–402*d* facing another of the projections 402*a*–402*d* across the light axis, weight distribution when fitting into the resin holder 50 becomes better, and an effect that the positioning becomes more stable may be obtained.

Thus, according to the first embodiment, it is possible to effectively suppress decreasing of the light effectiveness due to the light axes not coinciding caused by an inaccurate positioning of the ellipsoidal mirror 39 and the concave lens 60, and therefore, an effect that an excellent light emission is obtained.

Moreover, it is possible to obtain an advantage in a manufacturing process as below.

In other words, by using the ring mold B for forming the flange 401 including the projections 402*a*–402*d* when manufacturing the ellipsoidal mirror 39, as shown in FIG. 5, it is possible to use ellipsoidal mirrors with manufacturing variations.

Specifically, although an ellipsoidal mirror is usually formed as shown in FIG. 5 using this manufacturing method, a misalignment due to patterning may be caused. Especially, because glass material is used to form the ellipsoidal mirror 39, the manufacturing variations in tolerance due to the material property may not be ignored. However, in the first embodiment, it is possible to use such ellipsoidal mirrors despite the optical problems, because the light axis of the ellipsoidal mirror 39 is always set at the same position in relation to the projections 402*a*–402*d*.

It is also possible to obtain the same effect as above when the arrow mold C is used to form the projections 402*a*–402*d*.

In addition, in the first embodiment, as shown in FIG. 10A, the projections 402*a*–402*d* have a shape slidable only along a radial direction from the light axis. Accordingly, even when the ellipsoidal mirror 39 is distorted during the manufacturing process as shown in FIGS. 10C (smaller), 11A (rectangular), 11C (rhombic), and 11E (curved), the variations and distortions may be absorbed by fitting in a direction across the light axis. Therefore, it is possible to reduce shakiness in comparison with the conventional art, and prevent the misalignment of the light axes.

1-4 Structure of Lamp Lighting Device

Figure 6:
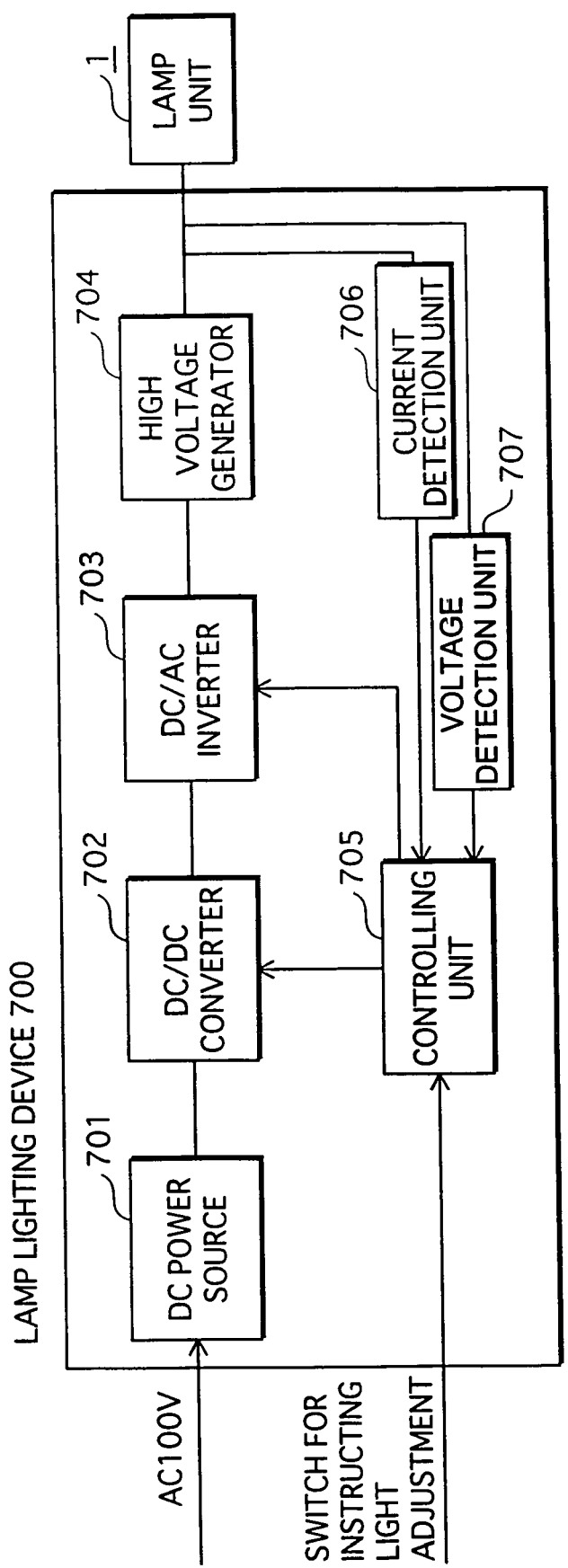
FIG. 6 is a block diagram illustrating a structure of a lamp lighting device.

Next, a structure of a lamp lighting device that drives the light source unit 1 is explained. FIG. 6 is a block diagram illustrating the structure of a lamp lighting device (ballast) 700 of the first embodiment.

As shown in the drawing, the lamp lighting device 700 includes a DC power source 701, a DC/DC converter 702, a DC/AC inverter 703, a high voltage generator 704, a controlling unit 705, a current detection unit 706, and a voltage detection unit 707.

the DC power source 701 is provided with such as a rectification circuit, and generates DC voltage from a 100 V AC power source. The DC/DC converter 702 is controlled by the controlling unit 705 having a macro computer, and supplies the DC/AC inverter 703 with a predetermined size of DC current. The DC/AC inverter 703, controlled by the controlling unit 705, generates AC current with rectangular waves at a predetermined frequency and sends the generated current to the high voltage generator 704. The high voltage generator 704 is provided with such as a transformer, and a high voltage generated by the high voltage generator 704 is applied to the high pressure mercury lamp 30 of the light source unit 1, so the light is emitted.

The light source unit 1 and the lamp lighting device 700 are incorporated into a projector 10 detailed below, and light emitted from the light source unit 1 is utilized for displaying images.

1-5 Structure of Projector

Figure 4:
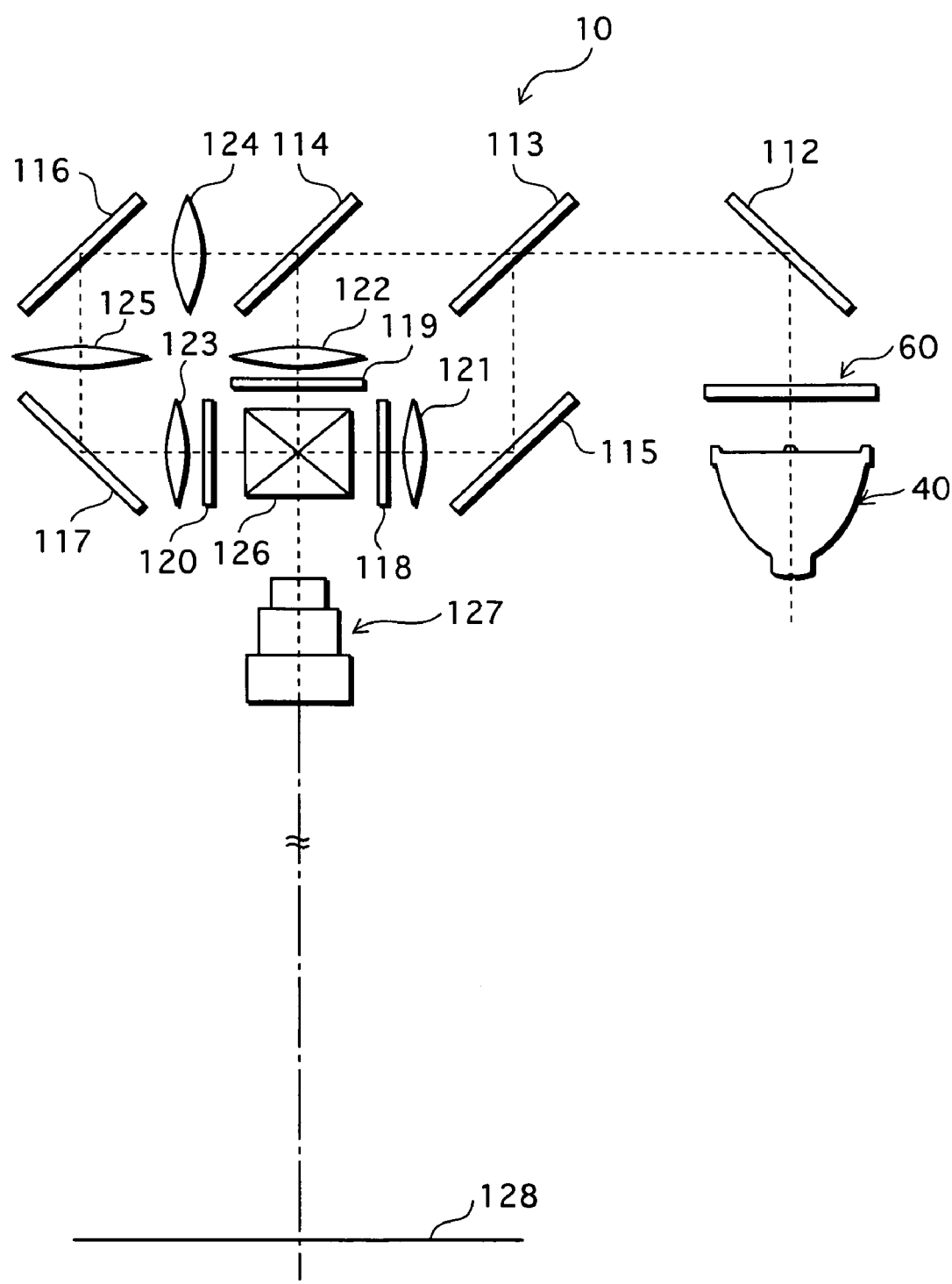
FIG. 4 is a view illustrating a structure of a projector.

Next, a structure of a projector that uses the light source unit 1 is explained below. FIG. 4 is a view illustrating an internal structure of the projector 10 using the high pressure mercury lamp 30 and the optical lighting apparatus 40 of the above structures.

The projector 10 includes a light source unit having the optical lighting apparatus 40, a mirror 112, dichroic mirrors 113 and 114 that separate white light into red, green, and blue, mirrors 115, 116, and 117 each reflect a different one of the separated lights, liquid crystal light bulbs 118, 119, and 120 each form an image in a corresponding single light, field lenses 121, 122, and 123, relay lenses 124 and 125, a dichroic prism 126 that combines the lights having gone through the liquid crystal light bulbs 118, 119, and 120, and a projection lens 127, and then an image from the projector 10 is projected on a screen 128. The projector 10 as described above is well-known as a so-called three-panel projector, other than a part that the projector 10 includes the light source unit according to the present invention, and a detailed explanation will not be given here.

By adopting the light source unit 1 to the above projector 10, it is possible to drive the projector utilizing high light effectiveness and suppressing the misalignment of the light axes. Accordingly, it is possible to give excellent display performance with less unevenness in luminance.

The excellent display performance without the misalignment of the light axes as described above is expected to have great effectiveness in such cases in which, for example, when displaying high-resolution images in hi-vision displays, and displaying minute structures clearly when an object is enlarged by a microscope.

2. Other Matters

In the above first embodiment, an example in which the projections 402*a*–402*d* are prism-shaped is explained. However, in order to fit the ellipsoidal mirror 39 and the resin holder 50 together, a shape of the projections 402*a*–402*d* are not restricted to a prism shape, and the projections may be in other shapes.

Specifically, the projections may be such as projections A, B, C, and D as shown in FIG. 9 as examples. The projections A and B has a circular base, the projection B has a parabolic cross section, and the projection C has a triangular cross section.

In choosing the shape of the projections, it is desirable that the projections have planes that incline at an angle of from 30 degrees to 60 degrees. It is also desirable that the projections are tapered toward the top.

Furthermore, as shown in FIGS. 12A–12D, the projection and the depression may be any of a combination of a triangular prism projection and a V-shape depression, a combination of a triangular prism projection and a V-shape cutout on a board, a combination of a triangular prism projection and a rectangular depression, and a combination of a circular cone projection and a V-shape depression. By using the above-combinations, the projections become slidable in the depressions, and it is possible to realize an accurate positioning.

Moreover, even though the ellipsoidal mirror 39 in the first embodiment has the projections 402a–402d as the first fitting parts and the resin holder 50 has the depressions 503a–503d as the second fitting parts, it is also possible that the ellipsoidal mirror 39 has depressions and the resin holder 50 has projections. In addition, it is also possible to use a combination of projections and depressions, for example, a combination in which the ellipsoidal mirror 39 has the projections 402a and 402b and the depressions 503c and 503d, and the resin holder 50 has the projections 402c and 402d and the depressions 503a and 503b.

Further, although the holder 50 in the first embodiment is made of resin (PPS resin), other kinds of material may also be used. However, it is necessary to use heat resistant material because a temperature of the high pressure mercury lamp 30 during driving becomes fairly high.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light source unit comprising:
an ellipsoidal mirror having an ellipsoid mirror surface and a flange disposed so as to surround the mirror surface, a plurality of pairs of first fitting parts being disposed on a surface of the flange, the first fitting parts in each pair facing one another across a light axis of a lamp;
the lamp disposed in a space surrounded by the ellipsoidal mirror such that rays emitted from the lamp are reflected on the mirror surface so as to be irradiated as parallel rays;
a holder having second fitting parts disposed so as to face the first fitting parts, the second fitting parts fitting one-to-one with the first fitting parts, the holder and the ellipsoidal mirror thereby being integrated; and
a lens held by the holder so as to face the lamp, wherein
(i) the first fitting parts are prism-shaped projections and the second fitting parts are depressions corresponding to the shape of the projections, or (ii) the second fitting parts are the projections and the first fitting parts are the depressions, and
when the first fitting parts and the second fitting parts are fitted together, a light axis of the ellipsoidal mirror and a light axis of the lens substantially coincide wherein
each of the prism-shaped projections is positioned in a manner that a center line in a lengthwise direction thereof is in a direction intersecting with the light axis of the lamp, and
each of the prism-shaped projections has a plane inclining at an angle of 30 degrees to 60 degrees with respect to a surface of the flange.

2. A projector including a light source unit according to claim 1.

3. A light source unit comprising:
an ellipsoidal mirror having a ellipsoid mirror surface and at least three first fitting parts disposed on a rim thereof;
the lamp disposed in a space surrounded by the ellipsoidal mirror such that rays emitted from the lamp are reflected on the mirror surface so as to be irradiated as parallel rays;
a holder having second fitting parts disposed so as to face the first fitting parts, the second fitting parts fitting one-to-one with the first fitting parts, the holder and the ellipsoidal mirror thereby being integrated;
a lens held by the holder so as to face the lamp, wherein
each first fitting part is slidable against a corresponding second fitting part in a direction that intersects perpendicular to a light axis of the ellipsoidal mirror, and
when the first fitting parts and the second fitting parts are fitted together, the light axis of the ellipsoidal mirror and a light axis of the lens substantially coincide, wherein
(i) the first fitting parts are prism-shaped projections and the second fitting parts are depressions corresponding to the shape of the projections, or (ii) the second fitting parts are the projections and the first fitting parts are the depressions, and
each of the prism-shaped projections is positioned in a manner that a center line of the prism-shaped projection in a lengthwise direction is in a direction intersecting with the light axis of the lamp; and
a flange is formed around a rim of mirror surface of the ellipsoidal mirror, and
each of the prism-shaped projections has a plane inclining at an angle of 30 degrees to 60 degrees with respect to a surface of the flange.

4. A projector including a light source unit according to claim 3.

5. A light source unit according to claim 3 wherein the flange of the ellipsoidal mirror has a perimeter substantially in the shape of a square.

6. A lamp projector assembly comprising:
a plastic base member having a pair of securing parts;
a reflector mirror with a flange having at least tree first fitting parts, the first fitting parts extending from and/or into the flange and each first fitting part has a plurality of inclined flat surfaces that extend toward each other;
a lens unit; and
a plastic holder for mounting the lens unit at a first end and having at least tree second fitting parts of a complementary configuration to the first fitting parts extending into and/or from a second end of the plastic holder, the plastic holder aligned with and contacting the pair of securing parts of the plastic base member, wherein when the first fitting part and the second fitting parts are operatively fitted together in the plastic base member an optical axis of the mirror and an optical axis of the lens unit substantially coincide.

7. The lamp projector assembly of claim 6 wherein
(i) the first fitting parts are of a predetermined shape to extend into the second fitting parts and the second fitting parts are V shaped depressions, or (ii) the second fitting parts are of a predetermined shape to extend into the first fitting parts and the first fitting parts are V shaped depressions.

8. The lamp projector assembly of claim 7 wherein
(i) the first fitting parts are prism-shaped projections and the second fitting parts are depressions of a predetermined shape to receive the first fitting parts, or (ii) the second fitting parts are prism-shaped projections and the first fitting parts are depressions of a predetermined shape to receive the second fitting parts.

* * * * *